United States Patent [19]

Darley et al.

[11] 4,364,961

[45] * Dec. 21, 1982

[54] MANUFACTURE OF BREAD CRUMB-LIKE PRODUCT

[75] Inventors: Kenneth S. Darley, Whitby; Michael A. F. Fenn, Ajax; David V. Dyson, Richmond Hill, all of Canada

[73] Assignee: The Griffith Laboratories, Limited, Scarborough, Canada

[ * ] Notice: The portion of the term of this patent subsequent to Aug. 19, 1997, has been disclaimed.

[21] Appl. No.: 248,721

[22] Filed: Mar. 30, 1981

[51] Int. Cl.$^3$ ............................................. A23D 6/00
[52] U.S. Cl. ..................................... 426/19; 426/498; 426/549; 426/465
[58] Field of Search .................. 426/19, 496, 465, 498, 426/520

[56] References Cited

U.S. PATENT DOCUMENTS 3,870,806  3/1975  Capossela et al. .................. 426/465
4,218,480  8/1980  Dyson et al. .......................... 426/19

FOREIGN PATENT DOCUMENTS 2545591  11/1976  Fed. Rep. of Germany ...... 426/496

Primary Examiner—Raymond N. Jones
Assistant Examiner—Elizabeth A. Hatcher
Attorney, Agent, or Firm—Sim & McBurney

[57] ABSTRACT

Farinaceous product particles having properties comparable to those of bread crumbs are formed by continuously mixing the components with gaseous leavening in a plug flow mixer, extruding dough from the mixer; cutting the extruded dough into particles, heating the dough particles to surface dry the particles and stabilize the shape; and subsequently drying them to the desired moisture level. The dried particles are comminuted to the desired crumb size.

12 Claims, No Drawings

MANUFACTURE OF BREAD CRUMB-LIKE PRODUCT

FIELD OF INVENTION

The present invention relates to the manufacture of a particulated leavened farinaceous product which resembles stale bread crumbs in appearance and properties.

BACKGROUND TO THE INVENTION

Bread particles, in the form of crumbs are used in a variety of food products, for example, fish coatings, chicken coatings, onion rings, meat patties, and as garnishes. The bread particles are generally produced by baking bread according to conventional yeast leavening procedures, allowing the bread to stale and then comminuting the stale loaf to the desired particle size. The time required for staling is normally about 1 to 3 days, necessitating a large storage space for the loaves while staling occurs, and the rehandling of the same, with interrupted unit processes thus being involved.

It has previously been suggested to utilize added gaseous materials, such as, carbon dioxide, for leavening of bread in place of yeast leavening. The use of continuous mixers in combination with added gaseous materials also has been described, for example, in U.S. Pat. No. 3,041,176 to Baker. In the latter patent, flour and water are premixed to form a slurry, the slurry is transferred by a supply hopper and a pump to a continuous mixer to which gas is introduced to form a continuous dough. The introduced gas is said by this patent to be used to raise the dough in subsequent baking to avoid the use of any yeast or ferment.

While the latter procedure is useful in decreasing substantially the overall baking time for a bread product, as compared to conventional procedures, the premixing of the components to form a slurry is time consuming, the total exclusion of yeast or other ferments prevents the use of the flavour enhancing properties thereof, and the procedure requires a baking step.

SUMMARY OF INVENTION

The present invention provides an improved procedure for the manufacture of a particulated leavened farinaceous product of characteristics comparable to those of conventional stale bread particles, which enables such particulated farinaceous product to be produced on a continuous basis without the necessity of a baking step.

The process of the present invention involves a substantially continuous procedure, which comprises continuous mixing of farinaceous product-forming components and carbon dioxide, or other gas or mixture of gases, under critical conditions, defined hereinafter, to form a gas-leavened dough, comminuting the dough to form discrete dough particles, exposing the dough particles to hot air to dry the surface of the particles and to stabilize the structure, and then drying the particles to the desired moisture content. The overall procedure involves only a short period of time, when compared to conventional baking processes and staling procedures.

GENERAL DESCRIPTION OF INVENTION

The particles of leavened farinaceous product which are produced in this invention have certain characteristics which render them desirable for a variety of end uses. The particles may have any desired particle size and usually characteristic of bread crumbs. The particles have a stable integral coherent shape and an opaque appearance resulting from the partially retrograded nature of the starch, are friable, and have a density of about 19 to about 35 lb/cu.ft. resulting from the porosity of the particles and to some extent, the size of the individual particles, a water absorption capability of about 1.5 to about 4 times its own weight, and a shear value of about 1.3 to about 8 kg.

The initial farinaceous product-forming ingredients used in the process may comprise any of the components conventionally used in bread making and itemized under the Standards of Identity, FDA Regulations 21 C.F.R. 136.110 to 0.180 inclusive. The basic components of any dough are flour and water, the term "flour" including farinaceous flours used alone or in combination with other flours and meals, such as, the permitted materials outlined in 21 C.F.R. 137.105 to 0.350 inclusive, as well as those of legumes, rye, sorghum and rice.

Varying quantities of components may be used, usually including shortening and salt in varying proportions, depending on the characteristics desired in the product and the flour used. Other farinaceous product-forming components which may be used include sugar, and oxidizing, maturing and improving agents, such as, potassium bromate, azodicarbonamide, cysteine hydrochloride and ascorbic acid.

Yeast, and amylolytic or proteolytic enzymes also may be included, to modify texture and flavour in the product, as described in more detail below. Emulsifiers and cell-wall improvers may be used.

Yeast is conventionally used for leavening purposes in bread-making. In this invention, yeast may be used, as a flavour enhancer for the farinaceous product rather than for leavening purposes, leavening in this invention being achieved by the use of gaseous materials, such as, carbon dioxide, nitrogen, air, or mixtures of gases.

As mentioned above, the various proportions of the farinaceous product-forming ingredients depend on the properties desired, the flour used and also on the nature and choice of the components. One suitable composition of ingredients, exclusive of water, which is utilized, in this invention, as a dry mix, includes:

Wheat flour—100 parts by weight
Shortening—up to about 8% by weight of flour
Salt—up to about 5 % by weight of flour Another suitable composition of ingredients also used as a dry mix in this invention, utilizing a mixture of flours, may comprise:

Wheat flour—75 parts by weight
Rye flour—25 parts by weight
Shortening—up to about 8% by weight of total flour
Salt—up to about 4% by weight of total flour In addition, one or more of the following optional components may be present, based on the weight of flour:

Yeast—0 to about 4% by weight
Sugar—0 to about 6% by weight
Yeast food—0.2 to about 0.35% by weight, when yeast is present
Protease—0 to about 85,000 H.U. per 100 lb. flour
Amylolytic enzyme—0 to about 6,000 SKB units/100 lb. flour
Mono and/or diglycerides—0 to about 2% by weight
Hydrolyzed wheat starch—0 to about 5% by weight
"Tween" Surfactant—0 to about 0.75% by weight Flavour-enhancing and/or texture-modifying premixes may be used to control the product flavour. Such premixes are formed from the above optional components.

Preferred flavour-enhancng mixes for use in this embodiment of the invention may be formed by providing a yeast slurry comprising, based on the weight of total flour:

Yeast—about 1.5 to about 3.5% by weight
Sugar—about 0.05 to about 0.5% by weight
Water—about 10 to about 25% by weight and utilizing this slurry as an additive to the other farinaceous product-forming materials.

Such slurry also may be used to provide texture modifications to the end product. In this case, the slurry is mixed with a liquid enzyme mixture comprising, based on the weight of total flour:

Amylolytic enzyme—about 1250 to about 6000 SKB Units/100 lb. flour, and/or
Proteolytic enzyme—about 25,000 to about 85,000 H.U./100 lb. of flour
Yeast food—about 0.25 to about 0.32% by weight
Sugar—about 1 to about 5% by weight
Water—about 30 to about 35% by weight
Flour—about 5 to about 20% by weight The resulting brew is fermented at a temperature of about 75° F. to about 105° F. for about 30 to about 90 minutes.

The yeast slurry is used in this embodiment in association with such additional water as may be required to provide the desired overall moisture content and with a dry mix comprising, by weight of total flour:

Flour—about 80 to about 95% by weight
Salt—about 1.0 to about 7% by weight
Shortening—up to about 8% by weight The presence of in situ salt in crumbs is advantageous in certain end uses and high levels of salt are attainable in this invention, since high concentration do not adversely interfere with the leavening. This contrasts markedly with conventional bread-forming procedures wherein salt concentrations above about 2% by weight decrease the leavening action of the yeast, thereby limiting the quantity of salt which can be incorporated into the final bread crumbs.

In the process of this invention, the farinaceous product-forming ingredients are fed to inlets at one end of a continuous mixing zone capable of plug flow therethrough. The mixing zone may take the form of an elongate screw-type mixer-extruder, suitably modified to provide the required processing conditions therein. The farinaceous product-forming components are fed to one end of the mixer in relative proportions suitable to provide an overall moisture content of intermixed components of about 30 to about 50% by weight, preferably about 37 to about 43% by weight. The dry mix, water, and any yeast slurry, are usually separately fed to the mixer.

Within the mixing zone, the farinaceous product-forming components are continuously intermixed while they are conveyed from one end of the mixing zone to the other, over a time period of about 15 to about 100 seconds, preferably about 20 to about 50 seconds.

A plurality of spaced gaseous inlets is provided along the length of the mixing zone and a gaseous material, or mixture of gaseous materials, is subjected into the mix through the openings. Carbon dioxide usually is used, often in admixture with nitrogen, as the gaseous material, although other materials may be used, including air and oxygen. The total gas fed to the mixing zone is in the range of about 1 to about 30 SCF, preferably about 8 to about 12 SCF, per 100 lbs. of dough.

The farinaceous product-forming components and the injected gas are subjected to high shear forces within the mixing zone, sufficient to cause simultaneous uniform mixing of the components and dispersion of the inert gas throughout the mix. The work done on the dough within the mixing zone varies from about 15 to about 40 watt hr/lb of dough, preferably about 20 to about 30 watt hr/lb.

The mix of farinaceous product-forming components and inert gas is heated within the mixing zone for at least a major proportion, typically about 75% of the length of the mixing zone to cause partial gelation of starch material contained in the farinaceous product-forming components. The temperature in the mixing zone is maintained sufficiently high that the heat applied combined with that resulting from the high shear mixing results in a dough emerging from the mixing zone having a temperature of about 90° to about 210° F., preferably about 130° to about 170° F., to achieve the partial gelation.

The dough resulting from the operations in the mixing zone in extruded therefrom under a back pressure which is usually in the range of about 200 to about 600 psig, and is preferably in the range of about 250 to about 400 psig, achieved by suitable design of the extrusion die.

The operations effected in this way in the mixing zone ensure that the final farinaceous product will have the properties of stale bread crumbs and no holding time is required at any stage of the process.

In this invention, therefore, the flour and water are separately fed directly to the mixer, the farinaceous product-forming components are conveyed in plug flow manner through the mixing zone while leavening gas is injected into the mix at a plurality of spaced locations, the flour, water and gas are thoroughly intermixed under critical high shear, temperature and back pressure conditions, and the dough-forming process is rapidly completed.

In a preferred embodiment of the present invention, the very short overall mixing time permits direct control to be exercised over the flavour of the final product, by the use of a yeast-based slurry added directly to the mixer at the upstream end.

The dough which is formed by this process contains trapped gaseous material which expands on leaving the mixer. Exit from the mixer is accomplished through a die containing a suitable number of orifices through which the dough passes. The cross-section of the orifices is usually rectangular and about $\frac{1}{2}$ to about 1" in dimension but may be of any other desired geometry. The dough is cut from the face of the die of produce dough pieces between about 1/16 and about $\frac{1}{2}$" in thickness, preferably between about 1/16 and about 3/16 inch and preferably about $\frac{1}{2}$ to about $\frac{3}{4}$" in cross-section.

The dough pieces are transported to a conventional forced air dryer using a hot air suction or pressure lift. The air lift temperature ranges from about 180° to about 300° F. preferably about 230° to about 290° F. The hot air in the lift assists drying by preheating the dough pieces and causing surface drying enabling the pieces to remain as discrete particles on the drier bed. Without the hot air lift there is a tendency for the particles to agglomerate and form a solid sheet on the dryer bed which hinders air flow.

After drying to the desired moisture, usually less than about 10 wt.%, the dough pieces are comminuted to a suitable size for use, usually less than about 5 mm.

EXAMPLES

EXAMPLE 1

An initial dry mix containing the following ingredients was prepared:

| Hard wheat flour | 47.853 |
|---|---|
| Rapido 80* | 23.926 |
| Pastry flour | 23.926 |
| Shortening | 2.871 |
| Seasoning | 1.424 |
| | 100.00 |

*Rapido 80 is a commercially available bread flour.

The dry mix was fed into one end of the extruder at 4.7 kg/min. Water was added to the same end of the extruder at 1.03 kg/min., 31% of which was added in a preconditioning screw and the remaining 69% at the start of the extruder. In addition a yeast brew consisting of:
Yeast—5.44 kg
Water—60 kg
Dextrose—1 kg
was metered in at the one end of the extruder at a rate of 1 liter/min. to give a total moisture content of 39%.

The components were continuously intermixed during passage from one end of the extruder to the other over a period of about 20 seconds. Carbon dioxide was fed into the extruder at 3 different locations at the rate of 95 SCF or 10.5 SCF/100 lb. dough while the extruder was heated to result in a dough temperature of 130° F. at the exit. Work was applied to the dough during formation thereof and passage through the extruder of 27 watt hr/lb and a back pressure of 300 psig existed at the outlet orifice.

Th dough was extruded through rectangular openings dimensioned ⅜×⅜ inch and cut into particles of length of 3/16 inch. These particles were conveyed by means of an upflow of hot air at a temperature of 280° F. for about 3 seconds to surface dry the wet particles. The surface dried non-sticky dough particles were then dried by conventional hot air drying at a temperature of about 300° F. to a moisture content of less than about 10 wt.%.

The dried dough particles had the properties set forth in the following Table I:

TABLE I

| Bulk density | 22.5 lb/ft$^3$ |
|---|---|
| Absorption | 3.43 × own weight |
| Shear | 3.10 kg |

EXAMPLE 2

An initial dry mix containing the following ingredients was prepared:

| Pastry flour | 71.0 |
|---|---|
| Hard wheat flour | 23.25 |
| Shortening | 3.0 |
| Salt | 2.5 |
| Atmul 500* | 0.25 |
| | 100.00 |

*A mixture of mono- and di-glycerides sold by Atlas Chemical Company.

The dry mix was fed into the one end of the extruder at 6.6 kg/min. Water was added at the same end at 2.78 liters/min; 10% of which was added in the preconditioning screw and the remaining 90% at the start of the extruder, to provide a moisture content of 39 wt.%.

The components were continuously intermixed during passage from one end of the extruder to the other over a period of about 20 seconds. Carbon dioxide was fed into the extruder at three locations under 150 psi pressure at a rate of 4.3 SCF/100 lb. of dough. The extruder was heated to give a dough exit temperature of 150° F. Work was applied to the dough during formation thereof and passage through the extruder of 21 watt hr/lb. and a back pressure of 300 psig existed at the outlet orifice.

The dough was extruded through rectangular openings of diameter ⅜×⅜ inch and cut into particles of length ⅛ inch. These particles were conveyed by means of a flow of hot air at a temperature of 280° F. for about 3 seconds to surface dry the wet particles. The surface-dried non-sticky dough particles were then dried by conventional hot air drying at about 300° F. to a final moisture of less than about 10 wt.%.

The dried dough particles had the properties set forth in the following Table II:

TABLE II

| Bulk density | 25 lb/ft$^3$ |
|---|---|
| Absorption | 3.1 × own weight |

SUMMARY OF DISCLOSURE

In summary of this disclosure, the present invention provides a unique procedure for the preparation of comminuted farinaceous product having properties comparable to stale bread particles which involves only a very short overall period of time. Modifications are possible within the scope of the invention.

What we claim is:
1. A continuous process for the manufacture of a particulated leavened farinaceous product, which comprises:
   feeding farinaceous product-forming components including flour and water to a continuous mixing zone in quantities such that the total moisture in the farinaceous product-forming components is about 30 to about 50% by weight,
   advancing the farinaceous product-forming components in plug flow manner through said mixing zone in about 15 to about 100 seconds,
   introducing at least one gaseous material to said farinaceous product-forming components at a plurality of locations during the passage of said components through said zone at a gas flow rate of about 1 to about 30 SCF/100 lb. of farinaceous product-forming components,
   subjecting said farinaceous product-forming components and introduced gaseous material to conditions of high shear within said mixing zone such that the work done on the materials within the mixing zone varies from about 15 to about 40 watt hr/lb. of farinaceous product-forming components to cause mixing of said components and distribution of gaseous material within the mixture,
   subjecting said farinaceous product-forming components and introduced gaseous material to an elevated temperature within said mixing zone during at least a major proportion of the time of passage thereof through said mixing zone to cause partial gelation of starch material contained in said farinaceous product-forming components while also subjecting said farinaceous product-forming components to a back pressure of about 200 to about 600 psig, extruding dough having an internal temperature of about 90° to about 210° F. through a die having a plurality of openings therein having a maximum diameter of about ½ to about 1 inch, cutting the dough extruded through said plurality of openings into discrete dough particles of about 1/16 to about ½ inch in length, subjecting said discrete dough particles to a flowing air stream having a temperature of about 180° to about 300° F. to surface dry the particles and to stabilize the physical form thereof, and drying said surface-dried particles to a moisture level of below about 10% by weight.

2. The process of claim 1 wherein said moisture content is about 37 to about 43 wt.%.

3. The process of claim 1 or 2 wherein said mixing time is about 20 to about 50 seconds, said gas inlet rate is about 8 to about 12 SCF/100 lb. of farinaceous product-forming components, said dough temperature is about 130° to about 170° F., said work applied is about 20 to about 300 watt hr/lb. of farinaceous product-forming components, and said back pressure is about 250 to about 400 psig.

4. The process of claim 3 wherein said gaseous material comprises carbon dioxide.

5. The process of claim 1 wherein said farinaceous product-forming components, exclusive of water, comprises:
   Flour—100 parts by weight
   Shortening—up to about 8% by weight of flour
   Salt—up to about 5% by weight of flour 6. The process of claim 1 wherein said farinaceous product-forming components, exclusive of water, comprise:
   Wheat flour—75 parts by weight
   Rye flour—25 parts by weight
   Shortening—up to 8% by weight of total flour
   Salt—up to about 4% by weight of total flour 7. The process of claim 5 or 6 wherein said farinaceous product-forming components further contain at least one further component selected from:
   Yeast—0 to about 4% by weight
   Sugar—0 to about 6% by weight
   Yeast food—0.2 to about 0.35% by weight when yeast is present
   Protease—0 to about 85,000 H.U. per 100 lb. of flour
   Amylolytic enzyme—0 to about 6000 SKB units per 100 lb. of flour
   Mono and/or diglycerides—0 to about 2% by weight
   Hydrolyzed wheat starch—0 to about 5% by weight
   Nonionic surfactant—0 to about 0.75% by weight 8. The process of claim 7, wherein a flavour-enhancing premix is incorporated in the farinaceous product-forming components by utilizing a slurry comprising, based on the total weight of flour:
   Yeast—about 1.5 to about 3.5% by weight
   Sugar—about 0.05 to about 0.5% by weight
   Water—about 10 to about 25% by weight 9. The process of claim 8 wherein said slurry is mixed with a liquid enzyme mixture, comprising, based on the total weight of flour:
   Amylolytic enzyme—about 1250 to about 6000 SKB units per 100 lb. of flour, and/or
   Proteolytic enzyme—about 25,000 to about 85,000 H.U. per 100 lb/of flour
   Yeast food—about 0.25 to about 0.32% by weight
   Sugar—about 1 to about 5% by weight
   Water—about 30 to about 35% by weight
   Flour—about 5 to about 20% by weight
and the mixture is fermented at a temperature of about 75° F. to about 105° F. for about 30 to about 90 minutes before incorporation in the farinaceous product-forming components.

10. The process of claim 1, 5 or 6 wherein said dough is extruded through rectangular openings having a size of about ½ to about 1 inch in dimension, said dough is cut to lengths of about 1/16 to about 3/16 inch, and said flowing air stream has a temperature of about 230° to about 290° F.

11. The process of claim 1 wherein said farinaceous product-forming components also includes salt in an amount of up to about 7 wt.% of the flour.

12. The process of claim 1 including comminuting the dried particles to a desired particle size.

* * * * *